United States Patent Office 2,772,291
Patented Nov. 27, 1956

2,772,291

HYDROGENATION OF MALEIC ANHYDRIDE

Herbert F. McShane, Jr., and Walter W. Gilbert, Wilmington, Del., assignors to E. I. du Pont de Nemours & Company, Wilmington, Del., a corporation of Delaware No Drawing. Application August 31, 1953,
Serial No. 377,718

3 Claims. (Cl. 260—343.6)

This invention relates to a new and improved process for the direct catalytic hydrogenation of maleic anhydride to tetrahydrofuran, tetramethylene glycol, and gamma-butyrolactone. More specifically, this invention has as its object the direct one-step production of the aforementioned hydrogenation products, preferably tetrahydrofuran, from maleic anhydride.

Such a one-step production of these substances may be accomplished by reacting maleic anhydride with hydrogen at an elevated temperature and pressure in the presence of a catalyst obtained by the reduction with hydrogen of a mixture of nickel amminomolybdate and nickel amminochromate until the same contains at least traces of elemental nickel and has the approximate composition $(NiMoO_2)_a \cdot (Ni_xCr_yO_z)_b$ where $a:b = 2:1$ to $1:2$, $x:y = 1.6:1$ to $2.2:1$ and $z:y = 2:1$ to $3:1$.

In accordance with one embodiment of this invention, a pressure reactor is charged with the anhydride, catalyst, and, if desired, a solvent. The reactor is cooled and evacuated. Hydrogen is then injected to a pressure in excess of 500 p. s. i. ("p. s. i." as used throughout this specification and claims means pounds per square inch gauge pressure), and the charge heated to a temperature of at least 175° C. At intervals, as necessary, hydrogen is injected to maintain the pressure within the reactor at the level selected for the reaction. After reaction is completed, as evidenced by cessation of pressure drop, the reaction mixture is permitted to cool, the reactor is opened and the contents discharged and filtered. The filtrate is then processed by methods well known to those skilled in the art, e. g., fractional distillation to isolate the products of reaction.

The following examples illustrate the invention by several specific embodiments. The specific details of these examples are not to be taken as limitations upon the invention.

EXAMPLE I

This example is given to illustrate the preparation of the catalyst for the one-step production of tetrahydrofuran, tetramethylene glycol, and gamma-butyrolactone in accordance with this invention.

Preparation of nickel amminochromate

To 3 liters of a hot (80–85° C.) aqueous solution containing 873 grams (3 moles) of $Ni(NO_3)_2 \cdot 6H_2O$ there was added, slowly with stirring, a solution of ammonium chromate $(NH_4)_2CrO_4$ prepared by dissolving 378 grams of ammonium dichromate $(NH_4)_2Cr_2O_7$ in water to a total volume of 3 liters and adding 210 cc. of 28% aqueous ammonia. The temperature of the slurry during precipitation was held between 80° C. and 85° C. A dark reddish brown precipitate of nickel amminochromate was formed. The pH of the slurry was adjusted to 7 by addition of 385 cc. of 28% aqueous ammonia. The slurry was stirred one hour and the precipitate washed twice by decantation with water, and retained in wet slurry form.

Preparation of nickel amminomolybdate

To 3 liters of a solution containing 873 grams (3 moles) of $Ni(NO_3)_2 \cdot 6H_2O$ to which had been added 135 cc. of 28% aqueous ammonia was added slowly, with stirring at room temperature, an ammonium molybdate solution prepared by dissolving 530 grams (3 moles, $MoO_4$) of ammonium paramolybdate $(NH_4)_6Mo_7O_{24} \cdot 4H_2O$ in 1500 cc. of water and adding 246 cc. of 28% aqueous ammonia. The pH of the slurry was then adjusted to 7 by addition of 80 cc. of 28% aqueous ammonia. The slurry was stirred for one hour at room temperature, nickel amminomolybdate precipitate was allowed to settle and washed twice by decantation with water at room temperature. The washed precipitate was retained in wet slurry form.

Preparation of nickel amminochromate-nickel amminomolybdate composite

The wet slurries of nickel amminomolybdate and nickel amminochromate, prepared as described above, were mixed in a 4-liter beaker with the addition of water to a volume of about 3 liters and the mixture stirred with an electrically-driven glass stirrer for about three hours. The mixed slurry yielded a gray suspension which was filtered by suction. The filter cake was dried overnight at 120° C. The dry cake weighed 862 grams and its analysis was as follows:

| Analysis | Percent | Percent Ave. | Atoms | Ratio |
|---|---|---|---|---|
| Percent Ni | 30.38–30.62 | 30.50 | 0.520 | 3.00 |
| Percent Cr | 9.27– 9.23 | 9.25 | 0.178 | 1.03 |
| Percent Mo | 18.09–18.55 | 18.32 | 0.191 | 1.10 |
| Percent $NH_3$ | 4.85– 4.94 | 4.89 | 0.287 | 1.66 |
| Percent O (Diff.) | | 36.63 | 2.290 | 13.20 |

The dry filter cake was crushed and screened to 8–14 mesh without pelleting.

Reduction of the nickel amminochromate-nickel amminomolybdate composite

The above blend was placed in a horizontal furnace and heated in 3.5 hours to 400° C. while passing hydrogen over it at a space velocity of 1000 reciprocal hours. The reduction was continued at 400° C. for 24 hours and a hydrogen space velocity of 1000 reciprocal hours. The reduced catalyst was cooled to room temperature in hydrogen, flushed with nitrogen, and removed from the furnace under nitrogen. The reduced product was black, pyrophoric and its analysis was as follows:

| Analysis | Percent | Percent Ave. | Atoms | Ratio | Empirical Formula |
|---|---|---|---|---|---|
| Percent Ni | 41.02–41.21 | 41.12 | 0.701 | 3.00 | |
| Percent Cr | 11.86–11.91 | 11.88 | 0.228 | 0.98 | $Ni_3Cr_{0.98}Mo_{1.18}O_{5.52}$ |
| Percent Mo | 26.44–26.24 | 26.34 | 0.275 | 1.18 | |
| Percent O (Diff.) | | 20.66 | 1.290 | 5.52 | |

The mixture of nickel amminochromate and nickel amminomolybdate before reduction may contain between 30% and 70% of the amminochromate and correspondingly between 70% and 30% of the amminomolybdate. It can also be made, if desired, by coprecipitating the components before reduction.

The reduction with hydrogen is carried out to a sufficient extent that the product contains at least traces of elemenal nickel. The free nickel is apparently contained on a substrate that gives the catalyst a high activity for the hydrogenation of maleic anhydride. In this respect the present catalyst differs materially from previously-known nickel-supported catalysts. For example, catalysts composed of nickel supported on materials such as clays, carbon, alumina, ferrous oxide, chromium oxide, and tungsten oxide have been found to be quite inactive in the one-step hydrogenation of maleic anhydride to produce tetrahydrofuran, tetramethylene glycol and gammabutyrolactone.

EXAMPLE II

In a 400 ml. silver-lined hydrogenation vessel, capable of withstanding the pressures employed, was placed 100 grams of maleic anhydride and 10 grams of reduced nickel amminomolybdate-nickel amminochromate catalyst prepared in accordance with Example I. The air was swept out by a stream of nitrogen. A shaker for agitating the hydrogenation vessel was placed into operation, then the vessel and contents were heated to 190° C. At 190° C. the pressure of hydrogen was increased to 12,000 p. s. i., and then the temperature was raised to 250° C. while the pressure was maintained between 11,000 p. s. i. and 12,000 p. s. i. The vessel was maintained at 250° C. and 11,000–12,000 p. s. i. for four hours.

After cooling and venting the bomb, the product was transferred to a distillation pot which was fitted with a distilling head and solid carbon dioxide-cooled receiver. The organic products separated from the catalyst by vacuum flash distillation conducted in two steps. The first step at 50 mm. absolute pressure removed the lower boilers and substances boiling up to 100° C. at 50 mm., and the second step at 5 mm. removed the higher boiling compounds with a minimum of decomposition.

The low boilers and the high boilers were combined and fractionated through a thirty plate column.

Fractionation yielded 20% tetrahydrofuran, 50% tetramethylene glycol and 1% butyrolactone.

EXAMPLE III

Maleic anhydride was hydrogenated by the general procedure of Example I, using the same catalyst, under the following reaction conditions:

| Catalyst (wt. percent)[a] | Temperature (° C.) | Time (hrs.) | H₂ Pressure (p. s. i.) | Products (percent conversions) | | |
|---|---|---|---|---|---|---|
| | | | | THF[b] | TMG[c] | BL[d] |
| 10 | 275 | 3.5 | 3,000 | 23 | | 50 |
| 5 | 275 | 4 | 7,000–12,000 | 34 | 22 | 16 |
| 20 | 260 | 4.5 | 3,000 | 32 | 16 | 20 |
| 10 | 225–275 | 4 | 12,000 | 50 | 17 | |
| 20 | 275 | 4 | 1,000 | 9 | | 60 |
| 22 | 275 | 4 | 2,000 | 25 | 1 | 35 |
| 10 | 250 | 4 | 12,000 | 22 | 53 | 2 |

[a] = Based on maleic anhydride.
[b] THF = Tetrahydrofuran.
[c] TMG = Tetramethylene glycol.
[d] BL = Gamma-butyrolactone.

The process of the present invention can be carried out either batchwise or in a continuous manner, with or without a solvent. Any reasonably pure grade of maleic anhydride is operable, the only precaution being necessary is to avoid poisoning of the catalyst. It is well known that materials such as halogens and many of their compounds, as well as many nitrogen- and sulfur-containing compounds, are harmful to the activity of nickel catalyst. Such materials are, therefore, preferably avoided in carrying out the present invention.

The exact chemical structure of the catalyst used in carrying out the process of the present invention is not known. It can, however, be defined as the substance obtained by the reduction with hydrogen of a mixture of nickel amminomolybdate and nickel amminochromate until the same contains at least traces of elemental nickel and has the approximate composition $$(NiMoO_2)_a \cdot (Ni_xCr_yO_z)_b$$

where $a:b = 2:1$ to $1:2$, $x:y = 1.6:1$ to $2.2:1$ and $z:y = 2:1$ to $3:1$.

The amount of catalyst used in carrying out the process of this invention is not critical. Operable amounts run from about 5% to 10% to about 30% (based on the weight of maleic anhydride). The larger amounts are used for lower pressures (500 to 2,000 p. s. i.). Amounts above 30% are operable but generally unnecessary. The time, temperature, pressure, and amount of catalyst used should be balanced in accordance with well-known catalytic reaction principles. The catalyst may be used as pellets or as finely-divided powders.

The present invention may generally be carried out at a temperature between 175° C. and 300° C. and between 500 and 12,000 p. s. i. pressure. The preferred conditions comprise a temperature between 225° C. and 300° C. and a pressure of 5,000 to 12,000 p. s. i. These conditions apply both for the production of tetrahydrofuran and tetramethylene glycol. Lower temperatures and pressures, e. g., pressures of about 1,000 to 3,000 p. s. i., and smaller amounts of catalyst are conducive to the production of gamma-butyrolactone.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. The process for the production of tetrahydrofuran, tetramethylene glycol, and gamma-butyrolactone which comprises reacting maleic anhydride with hydrogen at a temperature between 175° C. and 300° C. and a pressure between 500 p. s. i. and 12,000 p. s. i. in the presence of a catalyst obtained by the reduction with hydrogen of a mixture of nickel amminomolybdate and nickel amminochromate until the same contains at least traces of elemental nickel and has the approximate composition $(NiMoO_2)_a \cdot (Ni_xCr_yO_z)_b$ where $a:b = 2:1$ to $1:2$, $x:y = 1.6:1$ to $2.2:1$ and $z:y = 2:1$ to $3:1$.

2. The process for the production of tetrahydrofuran, tetramethylene glycol, and gamma-butyrolactone which comprises reacting maleic anhydride with hydrogen at a temperature between 225° C. and 300° C. and a pressure between 5,000 p. s. i. and 12,000 p. s. i. in the presence of a catalyst obtained by the reduction with hydrogen of a mixture of nickel amminomolybdate and nickel amminochromate until the same contains at least traces of elemental nickel and has the approximate composition $(NiMoO_2)_a \cdot (Ni_xCr_yO_z)_b$ where $a:b = 2:1$ to $1:2$, $x:y = 1.6:1$ to $2.2:1$ and $z:y = 2:1$ to $3:1$.

3. The process for the production of gamma-butyrolactone which comprises reacting maleic anhydride with hydrogen at a temperature between 225° C. and 300° C.

and a pressure between 1,000 p. s. i. and 3,000 p. s. i. in the presence of a catalyst obtained by the reduction with hydrogen of a mixture of nickel amminomolybdate and nickel amminochromate until the same contains at least traces of elemental nickel and has the approximate composition $(NiMoO_2)_a \cdot (Ni_xCr_yO_z)_b$ where $a:b = 2:1$ to $1:2$, $x:y = 1.6:1$ to $2.2:1$ and $z:y = 2:1$ to $3:1$.

References Cited in the file of this patent

UNITED STATES PATENTS

| | | |
|---|---|---|
| 1,964,000 | Lazier | June 26, 1934 |
| 2,072,861 | Amend et al. | Mar. 9, 1937 |
| 2,130,501 | Lazier | Sept. 20, 1938 |
| 2,584,531 | Arnold et al. | Feb. 5, 1952 |